(12) United States Patent  (10) Patent No.: US 7,482,565 B2
Morgan et al.                (45) Date of Patent:    Jan. 27, 2009

(54) SYSTEMS AND METHODS FOR CALIBRATING LIGHT OUTPUT BY LIGHT-EMITTING DIODES

(75) Inventors: Frederick M. Morgan, Canton, MA (US); Ihor A. Lys, Milton, MA (US)

(73) Assignee: Philips Solid-State Lighting Solutions, Inc., Burlington, MA (US)

(*) Notice: Subject to any disclaimer, the term of this patent is extended or adjusted under 35 U.S.C. 154(b) by 87 days.

(21) Appl. No.: 11/064,069

(22) Filed: Feb. 22, 2005

(65) Prior Publication Data

US 2006/0016960 A1  Jan. 26, 2006

Related U.S. Application Data

(63) Continuation of application No. 10/842,242, filed on May 10, 2004, now abandoned, which is a continuation of application No. 09/675,419, filed on Sep. 29, 2000, now abandoned.

(60) Provisional application No. 60/156,672, filed on Sep. 29, 1999.

(51) Int. Cl.
    *G01J 1/32*  (2006.01)
(52) U.S. Cl. ......................... 250/205; 362/231
(58) Field of Classification Search ............. 250/205; 315/307, 291; 362/800, 231
    See application file for complete search history.

(56) References Cited

U.S. PATENT DOCUMENTS

| 3,740,570 A | 6/1973 | Kaelin et al. |
|---|---|---|
| 3,910,701 A | 10/1975 | Henderson et al. |
| 4,349,870 A | 9/1982 | Shaw et al. |
| 4,396,871 A | 8/1983 | Scheuermann |
| 4,420,711 A | 12/1983 | Takahashi et al. |
| 4,621,643 A | 11/1986 | New, Jr. et al. |
| 4,622,881 A | 11/1986 | Rand |
| 4,625,152 A | 11/1986 | Nakai |
| 4,635,052 A | 1/1987 | Aoike et al. |
| 4,700,708 A | 10/1987 | New, Jr. et al. |
| 4,727,289 A | 2/1988 | Uchida |
| 4,753,148 A | 6/1988 | Johnson |

(Continued)

FOREIGN PATENT DOCUMENTS

AU    96/62679    12/1996

(Continued)

OTHER PUBLICATIONS

LM117/LM317A/LM317 "3-Terminal Adjustable Regulartor," National Semiconductor Corporation, May 1997, pp. 1-20.

(Continued)

*Primary Examiner*—Georgia Y Epps
*Assistant Examiner*—Kevin Wyatt
(74) *Attorney, Agent, or Firm*—Wolf, Greenfield & Sacks, P.C.

(57) ABSTRACT

A system and method for calibrating light output from an LED is provided. The system includes a support on which an LED is positioned, a photosensor to measure the light output from the LED, and means for calibrating and adjusting the light output of the LED. Calibration is accomplished by measuring the light output from the LED, comparing such output against a reference value, and adjusting the measured output against the reference value.

65 Claims, 6 Drawing Sheets

U.S. PATENT DOCUMENTS

| | | | |
|---|---|---|---|
| 4,770,179 A | 9/1988 | New, Jr. et al. | |
| 4,771,274 A | 9/1988 | Havel | |
| 4,780,621 A | 10/1988 | Bartelucci et al. | |
| 4,837,565 A | 6/1989 | White | |
| 4,843,627 A | 6/1989 | Stebbins | |
| 4,845,481 A | 7/1989 | Havel | |
| 4,857,944 A | 8/1989 | Hart et al. | |
| 4,887,074 A | 12/1989 | Simon et al. | |
| 4,912,714 A | 3/1990 | Hatanaka et al. | |
| 4,922,154 A | 5/1990 | Cacoub | |
| 4,934,852 A | 6/1990 | Havel | |
| 4,962,687 A | 10/1990 | Belliveau et al. | |
| 5,008,595 A | 4/1991 | Kazar | |
| 5,010,459 A | 4/1991 | Taylor et al. | |
| 5,019,769 A | 5/1991 | Levinson | |
| 5,073,029 A | 12/1991 | Eberly et al. | |
| 5,078,039 A | 1/1992 | Tulk et al. | |
| 5,083,063 A | 1/1992 | Brooks | |
| 5,089,748 A | 2/1992 | Ihms | |
| 5,128,595 A | 7/1992 | Hara | |
| 5,194,854 A | 3/1993 | Havel | |
| 5,209,560 A | 5/1993 | Taylor et al. | |
| 5,282,121 A | 1/1994 | Bornhorst et al. | |
| 5,294,865 A | 3/1994 | Haraden | |
| 5,307,295 A | 4/1994 | Taylor et al. | |
| 5,309,277 A * | 5/1994 | Deck | 359/387 |
| 5,329,431 A | 7/1994 | Taylor et al. | |
| 5,350,977 A | 9/1994 | Hamamoto et al. | |
| 5,357,170 A | 10/1994 | Luchaco et al. | |
| 5,374,876 A | 12/1994 | Horibata et al. | |
| 5,381,074 A | 1/1995 | Rudzewicz et al. | |
| 5,384,519 A * | 1/1995 | Gotoh | 315/324 |
| 5,388,357 A | 2/1995 | Malita | |
| 5,402,702 A | 4/1995 | Hata | |
| 5,404,282 A | 4/1995 | Klinke et al. | |
| 5,406,176 A | 4/1995 | Sugden | |
| 5,410,328 A | 4/1995 | Yoksza et al. | |
| 5,420,482 A | 5/1995 | Phares | |
| 5,436,535 A | 7/1995 | Yang | |
| 5,461,188 A | 10/1995 | Drago et al. | |
| 5,463,280 A | 10/1995 | Johnson | |
| 5,471,052 A | 11/1995 | Ryczek | |
| 5,489,771 A * | 2/1996 | Beach et al. | 250/205 |
| 5,493,183 A | 2/1996 | Kimball | |
| 5,504,395 A | 4/1996 | Johnson et al. | |
| 5,521,708 A | 5/1996 | Beretta | |
| 5,532,848 A | 7/1996 | Beretta | |
| 5,545,950 A | 8/1996 | Cho | |
| 5,561,346 A | 10/1996 | Byrne | |
| 5,565,855 A | 10/1996 | Knibbe | |
| 5,575,459 A | 11/1996 | Anderson | |
| 5,592,051 A | 1/1997 | Korkala | |
| 5,608,213 A * | 3/1997 | Pinkus et al. | 250/252.1 |
| 5,633,629 A | 5/1997 | Hochstein | |
| 5,642,129 A | 6/1997 | Zavracky et al. | |
| 5,661,645 A | 8/1997 | Hochstein | |
| 5,673,059 A | 9/1997 | Zavracky et al. | |
| 5,684,309 A | 11/1997 | McIntosh et al. | |
| 5,690,486 A | 11/1997 | Zigelbaum | |
| 5,734,590 A | 3/1998 | Tebbe | |
| 5,751,118 A | 5/1998 | Mortimer | |
| 5,769,527 A | 6/1998 | Taylor et al. | |
| 5,809,213 A * | 9/1998 | Bhattacharjya | 358/1.6 |
| 5,821,695 A | 10/1998 | Vilanilam et al. | |
| 5,831,686 A * | 11/1998 | Beretta | 348/602 |
| 5,850,126 A | 12/1998 | Kanbar | |
| 5,851,063 A | 12/1998 | Doughty et al. | |
| 5,859,658 A | 1/1999 | Hammond | |
| 5,896,010 A | 4/1999 | Mikolajczak et al. | |
| 5,956,158 A | 9/1999 | Pinzarrone et al. | |
| 5,961,201 A | 10/1999 | Gismondi | |
| 5,982,957 A | 11/1999 | DeCaro et al. | |
| 6,008,783 A | 12/1999 | Kitagawa et al. | |
| 6,016,038 A | 1/2000 | Mueller et al. | |
| 6,025,550 A | 2/2000 | Kato | |
| 6,031,343 A | 2/2000 | Recknagel et al. | |
| 6,068,383 A | 5/2000 | Robertson et al. | |
| 6,072,280 A | 6/2000 | Allen | |
| 6,078,732 A | 6/2000 | Beretta | |
| 6,095,661 A | 8/2000 | Lebens et al. | |
| 6,097,352 A | 8/2000 | Zavracky et al. | |
| 6,100,913 A | 8/2000 | Aikoh et al. | |
| 6,122,065 A | 9/2000 | Gauthier | |
| 6,127,783 A | 10/2000 | Pashley et al. | |
| 6,150,774 A | 11/2000 | Mueller et al. | |
| 6,166,496 A | 12/2000 | Lys et al. | |
| 6,175,201 B1 | 1/2001 | Sid | |
| 6,183,086 B1 | 2/2001 | Neubert | |
| 6,211,626 B1 | 4/2001 | Lys et al. | |
| 6,259,430 B1 | 7/2001 | Riddle et al. | |
| 6,285,139 B1 | 9/2001 | Ghanem | |
| 6,292,901 B1 | 9/2001 | Lys et al. | |
| 6,329,764 B1 | 12/2001 | van de Ven | |
| 6,330,111 B1 | 12/2001 | Myers | |
| 6,331,915 B1 | 12/2001 | Myers | |
| 6,340,868 B1 | 1/2002 | Lys et al. | |
| 6,411,046 B1 | 6/2002 | Muthu | |
| 6,414,661 B1 | 7/2002 | Shen et al. | |
| 6,414,756 B1 | 7/2002 | Tsukada | |
| 6,430,603 B2 | 8/2002 | Hunter | |
| 6,441,558 B1 | 8/2002 | Muthu et al. | |
| 6,445,139 B1 | 9/2002 | Marshall et al. | |
| 6,448,550 B1 | 9/2002 | Nishimura | |
| 6,459,919 B1 | 10/2002 | Lys et al. | |
| 6,473,065 B1 | 10/2002 | Fan | |
| 6,495,964 B1 | 12/2002 | Muthu et al. | |
| 6,510,995 B2 | 1/2003 | Muthu et al. | |
| 6,528,954 B1 | 3/2003 | Lys et al. | |
| 6,548,967 B1 | 4/2003 | Dowling et al. | |
| 6,577,080 B2 | 6/2003 | Lys et al. | |
| 6,608,453 B2 | 8/2003 | Morgan et al. | |
| 6,608,614 B1 | 8/2003 | Johnson | |
| 6,624,597 B2 | 9/2003 | Dowling et al. | |
| 6,717,376 B2 | 4/2004 | Lys et al. | |
| 6,720,745 B2 | 4/2004 | Lys et al. | |
| 6,741,351 B2 | 5/2004 | Marshall et al. | |
| 6,774,584 B2 | 8/2004 | Lys et al. | |
| 6,777,891 B2 | 8/2004 | Lys et al. | |
| 6,781,329 B2 | 8/2004 | Mueller et al. | |
| 6,788,011 B2 | 9/2004 | Mueller et al. | |
| 6,801,003 B2 | 10/2004 | Schanberger et al. | |
| 6,806,659 B1 | 10/2004 | Mueller et al. | |
| 6,807,202 B1 | 10/2004 | Plamper et al. | |
| 6,869,204 B2 | 3/2005 | Morgan et al. | |
| 6,883,929 B2 | 4/2005 | Dowling | |
| 6,888,322 B2 | 5/2005 | Dowling et al. | |
| 6,897,624 B2 | 5/2005 | Lys et al. | |
| 6,936,978 B2 | 8/2005 | Morgan et al. | |
| 6,965,205 B2 | 11/2005 | Piepgras et al. | |
| 6,967,448 B2 | 11/2005 | Morgan et al. | |
| 6,969,954 B2 | 11/2005 | Lys | |
| 6,975,079 B2 | 12/2005 | Lys et al. | |
| 6,992,803 B2 | 1/2006 | Chang | |
| 7,027,015 B2 | 4/2006 | Booth, Jr. et al. | |
| 7,067,995 B2 | 6/2006 | Gunter et al. | |
| 7,148,632 B2 | 12/2006 | Berman et al. | |
| 2002/0038157 A1 | 3/2002 | Dowling et al. | |
| 2002/0044066 A1 | 4/2002 | Dowling et al. | |
| 2002/0047624 A1 | 4/2002 | Stam et al. | |
| 2002/0048169 A1 | 4/2002 | Dowling et al. | |
| 2002/0070688 A1 | 6/2002 | Dowling et al. | |
| 2002/0074559 A1 | 6/2002 | Dowling et al. | |
| 2002/0078221 A1 | 6/2002 | Blackwell et al. | |
| 2002/0130627 A1 | 9/2002 | Dowling et al. | |

| | | |
|---|---|---|
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0158583 A1 | 10/2002 | Lys et al. |
| 2002/0176259 A1 | 11/2002 | Ducharme |
| 2003/0011538 A1 | 1/2003 | Lys et al. |
| 2003/0028260 A1 | 2/2003 | Blackwell |
| 2003/0057884 A1 | 3/2003 | Dowling et al. |
| 2003/0057887 A1 | 3/2003 | Dowling et al. |
| 2003/0076281 A1 | 4/2003 | Morgan et al. |
| 2003/0100837 A1 | 5/2003 | Lys et al. |
| 2003/0107887 A1 | 6/2003 | Eberl |
| 2003/0133292 A1 | 7/2003 | Mueller et al. |
| 2003/0137849 A1 | 7/2003 | Alden |
| 2003/0214817 A1 | 11/2003 | Hacker |
| 2003/0222587 A1 | 12/2003 | Dowling et al. |
| 2004/0036006 A1 | 2/2004 | Dowling |
| 2004/0052076 A1 | 3/2004 | Mueller et al. |
| 2004/0066652 A1 | 4/2004 | Hong |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0113568 A1 | 6/2004 | Dowling et al. |
| 2004/0116039 A1 | 6/2004 | Mueller et al. |
| 2004/0130909 A1 | 7/2004 | Mueller et al. |
| 2004/0135522 A1 | 7/2004 | Berman et al. |
| 2004/0178751 A1 | 9/2004 | Mueller et al. |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2005/0099824 A1 | 5/2005 | Dowling et al. |
| 2005/0116665 A1 | 6/2005 | Colby et al. |
| 2005/0116667 A1 | 6/2005 | Mueller et al. |
| 2005/0151489 A1 | 7/2005 | Lys et al. |
| 2005/0200578 A1 | 9/2005 | Lee et al. |
| 2005/0213352 A1 | 9/2005 | Lys et al. |
| 2005/0213353 A1 | 9/2005 | Lys |
| 2005/0218838 A1 | 10/2005 | Lys |
| 2005/0218870 A1 | 10/2005 | Lys |
| 2005/0219872 A1 | 10/2005 | Lys |
| 2005/0231133 A1 | 10/2005 | Lys |
| 2005/0236029 A1 | 10/2005 | Dowling |
| 2005/0236998 A1 | 10/2005 | Mueller |
| 2005/0253533 A1 | 11/2005 | Lys et al. |
| 2005/0275626 A1 | 12/2005 | Mueller |
| 2005/0276053 A1 | 12/2005 | Nortrup |
| 2006/0002110 A1 | 1/2006 | Dowling |
| 2006/0109649 A1 | 5/2006 | Ducharme et al. |

FOREIGN PATENT DOCUMENTS

| | | |
|---|---|---|
| CA | 2178432 | 12/1996 |
| DE | 19602891 A1 | 8/1997 |
| EP | 0413441 A1 | 2/1991 |
| EP | 495305 A2 | 7/1992 |
| EP | 0497431 A1 | 8/1992 |
| EP | 0599494 A2 | 6/1994 |
| EP | 0534710 B1 | 1/1996 |
| EP | 0752632 A3 | 1/1997 |
| EP | 823813 A2 | 2/1998 |
| EP | 935234 A1 | 8/1999 |
| EP | 942631 A2 | 9/1999 |
| EP | 1020352 A2 | 7/2000 |
| EP | 1113215 A2 | 7/2001 |
| EP | 1152642 A | 11/2001 |
| FR | 2640791 | 6/1990 |
| GB | 1439924 A | 6/1976 |
| GB | 2029135 A | 3/1980 |
| GB | 2045098 A | 10/1980 |
| GB | 2135536 A | 8/1984 |
| GB | 2176042 A | 12/1986 |
| GB | 2327487 A | 1/1999 |
| JP | 06043830 | 2/1994 |
| JP | 0720711 | 1/1995 |
| JP | 7-39120 | 7/1995 |
| JP | 8-106264 | 4/1996 |
| JP | 08180978 A | 7/1996 |
| JP | 9320766 | 12/1997 |
| JP | 2001-325810 A | 11/2001 |
| WO | WO8905086 | 6/1989 |
| WO | WO9418809 | 8/1994 |
| WO | WO9513498 | 5/1995 |
| WO | WO9641098 | 12/1996 |
| WO | 99/30537 | 6/1999 |
| WO | 01/73818 | 10/2001 |

OTHER PUBLICATIONS

DS96177 RS-485/RS-422 "Differential Bus Repeater," National Semiconductor Corporation, Oct. 1993, pp. 1-8.

DS2003/DS9667/DS2004 "High Current/Voltage Darlington Drivers," National Semiconductor Corporation, Dec. 1995, pp. 1-8.

LM140A/LM140/LM340A/LM7800C "Series 3-Terminal Positive Regulators," National Semiconductor Corporation, Jan. 1995, pp. 1-14.

"http://www.luminus.cx/projects/chaser," (Nov. 13, 2000), pp. 1-16.

\* cited by examiner

BEFORE CALIBRATION COLOR
PEAKS CAN RANGE WIDELY

*FIG. 3A*

AFTER CALIBRATION COLOR PEAKS
CAN BE SCALED APPROPRIATELY

SYSTEMS AND METHODS FOR CALIBRATING LIGHT OUTPUT BY LIGHT-EMITTING DIODES

CROSS-REFERENCES TO RELATED APPLICATIONS

This application claims the benefit, under 35 U.S.C. §120, as a continuation of U.S. Non-provisional application Ser. No. 10/842,242, filed May 10, 2004 (now abandoned), which in turn is a continuation of U.S. Non-Provisional application Ser. No. 09/675,419, filed Sep. 29, 2000, (now abandoned). Ser. No. 09/675,419 claims the benefit, under 35 U.S.C. §119 (e), of U.S. Provisional Application Ser. No. 60/156,672, filed Sep. 29, 1999. Each of the foregoing applications is hereby incorporated herein by reference.

TECHNICAL FIELD

The present invention relates generally to light-emitting diodes, and more particularly, to systems and methods for calibrating illumination output generated by light-emitting diodes.

BACKGROUND

Light-emitting diodes (LEDs), when disposed on a circuit, accept electrical impulses from the circuit and convert the impulses into light signals. LEDs are typically energy efficient and can have a long lifetime.

Various types of LED exists, including air gap LEDs, GaAs light-emitting diodes, polymer LEDs, and semi-conductor LEDs, among others. Although most LEDs in current use are red, LEDs may take any color. In addition, when several LEDs, each of a commonly used primary color—red, blue or green—are combined in different proportions, the combination can generate almost any color in the visible spectrum in response to changing electrical signals. Alternatively, a single LED may be designed to include dies, each with a primary color (i.e., red, blue, and green), which can be combined to generate almost any colors.

Traditionally, LEDs have been poor in their ability to generate sufficient light output for illumination. Accordingly, LEDs have been used in low light environments, such as a flashing light on a modem or other computer components, or as a digital display of a wristwatch. However, over the past several years, the ability of the LEDs to generate sufficiently high intensity light output has increased substantially. Thus, LEDs have recently been used in arrays for flashlights, traffic lights, scoreboards and similar displays, and as television displays.

Despite this new development, the manufacturing of high-intensity LEDs is still a challenging process. In particular, it has been difficult to precisely predict the performance of an LED-based product in terms of total light output and quality of the output. Specifically, as an LED increases in output intensity, the quality of the output decreases.

In general, during manufacturing, the LEDs are tested for total light output and subsequently classified into "bins". Depending on the manufacturer, however, this classification can happen either after the semiconductor wafer has been sliced into individual dies or after the die is packaged into the LED plastic housing. In either case, for each LED, a light output determination is made of both wavelength (the color of light) and intensity of the output. The LEDs are then sorted and sold based on the bin-type for which they have been classified.

It should be noted that even with bin sorting, there remain substantial and perceptible differences in the light output amongst LEDs. This difference, as a result, can lead to perceptible differences in light output between otherwise identical LED-based products. Moreover, if "additive mixing" is employed, wherein a few LEDs of different colors are mixed to produce other colors, should the color in one or more of these LEDs be off, then the results of the additive mixture will also be off.

Furthermore, the light output from the LEDs may change over time as a result of a variety of factors, and can also contribute to perceptible differences in light output. For instance, the LEDs may degrade or shift in color output over time, as part of a normal deterioration of the LEDs. In addition, long term exposure of the LEDs to high heat, or requiring the LEDs to maintain high intensity light output over an extended period of time, such that the LEDs produce too much heat, or if the heat can not be removed sufficiently quickly away from the LEDs, such effects can accelerate the deterioration of the LEDs and lead to permanent changes in the LEDs.

Accordingly, it is desirable to provide a system which can calibrate and adjust the light output of each LED, so that uniformity in light output by the LED can be achieved, during manufacturing, and subsequently maintained during the lifetime of the LED, either alone or in combination.

SUMMARY

The present invention, in accordance with one embodiment, provides a method for calibrating light output by a light-emitting diode (LED). The method includes generating light output through the LED. Subsequently, measurement of the light output generated by the LED is obtained. Thereafter, the light output measurement is compared to a reference value designated for an LED of the type similar in classification (i.e., from the-same bin) to the LED being calibrated. Once the comparison is made, if there are any differences between the light output measurement and the reference value, the light output of the LED being calibrated is adjusted against the reference value. A calibration value is thereafter formulated from the adjustment of the output measurement against the reference value. Subsequently, the calibration value may be stored in a manner which permits access by the calibrated LED, so that upon a subsequent generation of light output, the calibration value may be accessed to permit the calibrated LED to generate a light output that approximates an output accorded to the reference value. The light output may be calibrated to adjust the intensity of the output, as well as the color of the output by the LED. It should be noted that the calibration protocol of the present invention may be implemented in an environment where there is an existence or absence of ambient light.

In another embodiment, the present invention provides a system for calibrating light output by an LED. The system, in one embodiment, includes a support to which an LED to be calibrated may be positioned thereon. The system further includes a photosensor, placed in a manner which permits receipt of light output by the LED, for obtaining an output measurement from the light output. The system further includes a processor in communication with the photosensor and for formulating a calibration value from an adjustment of the output measurement against a reference value. The processor may also be in communication with the LED for transmitting thereto a resulting value from the calibration. A memory mechanism may be provided in association with the LED on which the resulting value from the calibration may be stored for subsequent access during light output generation by the LED.

The present invention also provides a calibration device for calibrating light output from an LED. The device includes a support to which an LED to be calibrated may be positioned thereon, and a photosensor adjacent to the support for obtaining an output measurement generated by the LED. The device further includes a communication mechanism through which an output measurement from the photosensor may be communicated to a processor for formulation of a calibration value, and through which the calibration value may subsequently be communicated to the LED and stored on a memory device coupled to the LED. The device, in one embodiment, may be a handheld device, and may include a display to provide to a user status of the light output of the LED being calibrated. The device may also include an interface to permit the user to vary light output parameters for the LED; and a memory mechanism for storing the output measurement from the photosensor, which output measurement can subsequently be communicated to an off-site processor for calibration processing. In an alternate embodiment, the device includes a calibration processor therein for prompt and efficient calibration.

In accordance with another embodiment, a calibration device is provided for calibrating light output from an LED, while permitting the LED to remain within its illumination device (i.e., the LED does not have to be removed from the light fixture for calibration). The calibration device includes a housing, an activation unit for inducing light output from an LED to be calibrated, and a photosensor at one end of the housing for obtaining an output measurement from the light output generated by the LED. The calibration device also includes a communication mechanism in the housing through which output measurement from the photosensor can be communicated to a processor for formulation of a calibration value, and through which the calibration value may subsequently be received by the device and subsequently communicated to the LED in the illumination device. The device, in one embodiment, may be a handheld device, and may include a display to provide to a user status of the light output of the LED being calibrated, an interface to permit the user to vary light output parameters for the LED. The device may also include a memory mechanism for storing the output measurement from the photosensor, which output measurement can subsequently be communicated to an off-site processor for calibration processing. In an alternate embodiment, the device includes a calibration processor.

The present invention further provides an illumination device having a housing, an LED illumination source within the housing, and a photosensor adjacent to the LED illumination source to obtain an output measurement generated by the LED illumination source. The device also includes a processor within the housing and in communication with the photosensor for calibrating the output measurement from the photosensor against a reference value. The processor in also in communication with the LED for transmitting thereto a resulting calibration value from the processor. The device further includes a memory mechanism coupled to the LED illumination source and on which the resulting calibration value from the processor may be stored. The device may also include a display on which parameters regarding light output from the LED illumination source may be provided to inform a user of the status of the light output, and an interface to permit the user to vary the light output parameters.

BRIEF DESCRIPTION OF THE DRAWINGS

The various advantages of the present invention will become apparent to one skilled in the art by reading the following specification and appended claims and by referencing the following drawings in which:

DETAILED DESCRIPTION

Figure 1:
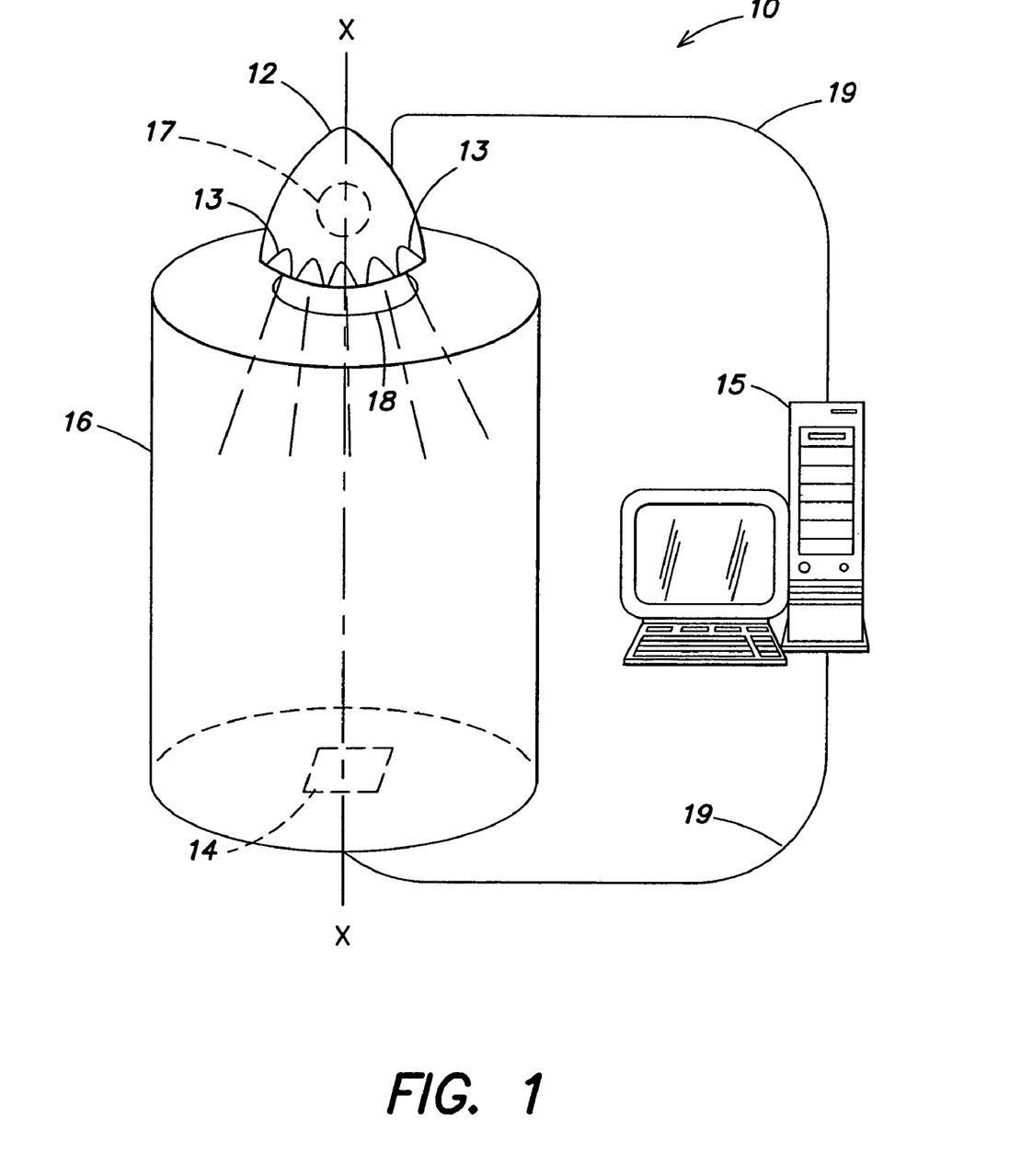
FIG. 1 illustrates, in accordance with an embodiment of the present invention, a system for calibrating light output from a light-emitting diode.

Referring now to the drawings, in FIG. 1, there is shown a system 10 for calibrating light output from a light-emitting diode (LED). The system 10, in one embodiment, includes a support 12, on which one or more LEDs 13 to be calibrated may be positioned. The support 12 may also accommodate a module (not shown) with one or more LEDs 13 therein, similar to those modules used in connection with various LED illumination devices. Such a module is disclosed in U.S. Pat. No. 6,016,038, which is hereby incorporated herein by reference.

The system 10 also includes a photosensor 14 for measuring the photometric output (i.e., light output) of the LED 13. For the ease of discussion, reference will be made to a single LED 13, with the understanding that the system 10 is capable of calibrating multiple LEDs. The photosensor 14, may be placed in any location relative to the LED 13, so long as the photosensor 14 can receive the output by the LED 13. Accordingly, the photosensor 14 may, for instance, be adjacent to the LED 13, or in substantial alignment with the LED 13, as illustrated in FIG. 1. An example of a photosensor which may be used in connection with the system 10 for obtaining an output measurement from the LED 13 is a photosensor manufactured by Ocean Optics Device, which can measure the color output, as well as intensity of the output.

In addition to a photometric sensor, other types of sensors may be used to measure the light output of the LED 13. Examples of sensors which may be used include, but not limited to, a photometer, spectrophotometer, spectroradiometer, spectrum analyzer, spectrometer, CCD, photodiode, photocell, and thermocouple.

A processor 15 may be provided in communication with the photosensor 14 to calibrate and adjust the output measurement received from the photosensor 14 against a reference value for intensity and/or color for such an LED. (A detailed description of the calibration process will be described hereinafter below.) The processor 15 may also be in communication with the LED 13, so as to transmit to the LED 13 a calibration value (obtained from the calibration and adjustment of the output measurement against the reference value)

for adjusting the ultimate output by the LED 13, whether such adjustment is with respect to intensity or color. It should be appreciated that the calibration value, when taken into account during periods of light output by the LED 13, subsequent to the calibration, permits the light output from the LED 13 to approximate an output accorded to the reference value.

As LEDs are highly responsive to changing electrical signals, i.e., changes in the LED color and intensity state may be quite rapid in response to changing electrical signals, the processor 15 may be controlled by, for example, a computer program, to send the appropriate electrical signals to the LED 13 being calibrated. The signals from the processor 15 sent to the LED 13 may also be digital in nature, so that calibration of the LED 13 may be as precise as possible. As shown in FIG. 1, the processor 15 may be part of computer. However, it should be appreciated that the processor 15 may be part of any device capable of providing the processor with appropriate signals.

The system 10 further includes a memory mechanism 17 in association with the one or more LEDs 13, and on which the calibration value for use in adjusting the light output by the one or more LEDs 13 is stored. Memory mechanism 17 may be any commercially available memory mechanism having data storing capability. In one embodiment of the invention, the memory mechanism 17 is physically coupled to the one or more LEDs 13, so that once the calibration value has been stored thereon, the memory mechanism 17 can be removed from the support 12 along with the one or more LEDs 13. Upon subsequent generation of light output from the LED 13 in, for example, an illumination device, the calibration value on the memory mechanism 17 can be accessed to affect the output generated from the LED 13. In other words, the calibration value permits the light output from the LED to approximate light output accorded to a reference value for that type of LED.

Still referring to FIG. 1, the system 10, in accordance with one embodiment of the present invention, includes a housing 16 extending from the support 12 to the photosensor 14. The housing 16, in one embodiment, may be an enclosed structure configured to encompass the support 12 and the photosensor 14, so as to block ambient light from interfering with measurement of the LED light output by the photosensor 14 during calibration. The housing 16 may also be provided with an opening 18 through which the LED 13 can access within the housing and be positioned on the support 12.

As shown in FIG. 1, communication between the processor 15 and either of the LED 13 or the photosensor 14 can be implemented by a cable 19. Alternatively, a wire, network, or a combination thereof may be employed in place of cable 19. It should be appreciated that communication between the processor 15 and either of the LED 13 or the photosensor 14 can be by wireless means, including but not limited to, radio frequency (RF), infrared (IR), microwave, electromagnetic transmission, acoustic, Bluetooth, home RF, or other wireless means.

The system 10 can be used to calibrate light output, such as light intensity, from an individual LED or multiple LEDs. Alternatively, the system 10 can be used to calibrate the color illumination of an LED having multiple color dies, or multiple LEDs, each of different color. The need to calibrate the color illumination can be important, especially when color mixing is involved, where the cumulative output of the individual die in one LED, or of multiple color LEDs can be affected by any perceptible differences between the dies or LEDs of the same color. For example, when Red, Green and Blue dies are used in one LED or when groups of Red, green and Blue LEDs are used to generate a range of color within a color spectrum, including white light, even after appropriate circuit implementations, if there are any malfunctioning dies or LEDs, those malfunctioning dies or LEDs can generate very different light intensity and color outputs, thereby affecting the overall light output. These differences can often be seen in older LEDs (i.e., after the LEDs have been in use for some time), and can sometimes be observed in new LEDs, even in those newly manufactured. Accordingly, it is useful to calibrate newly manufactured LEDs or recalibrate used LEDs, so that a desired light output can be achieved.

Calibration may be accomplished, in an embodiment, through the use of photosensor 14. As shown in FIG. 1, the photosensor 14 and LED 13 can be positioned within the housing 16 along axis X and facing towards one another. Although the photosensor 14 and the LED 13 can be in alignment, it should be appreciated that their position relative to one another can be in any arrangement, so long as the photosensor 14 is capable of receiving the light output from the LED 13 in a uniform manner.

Figure 2:
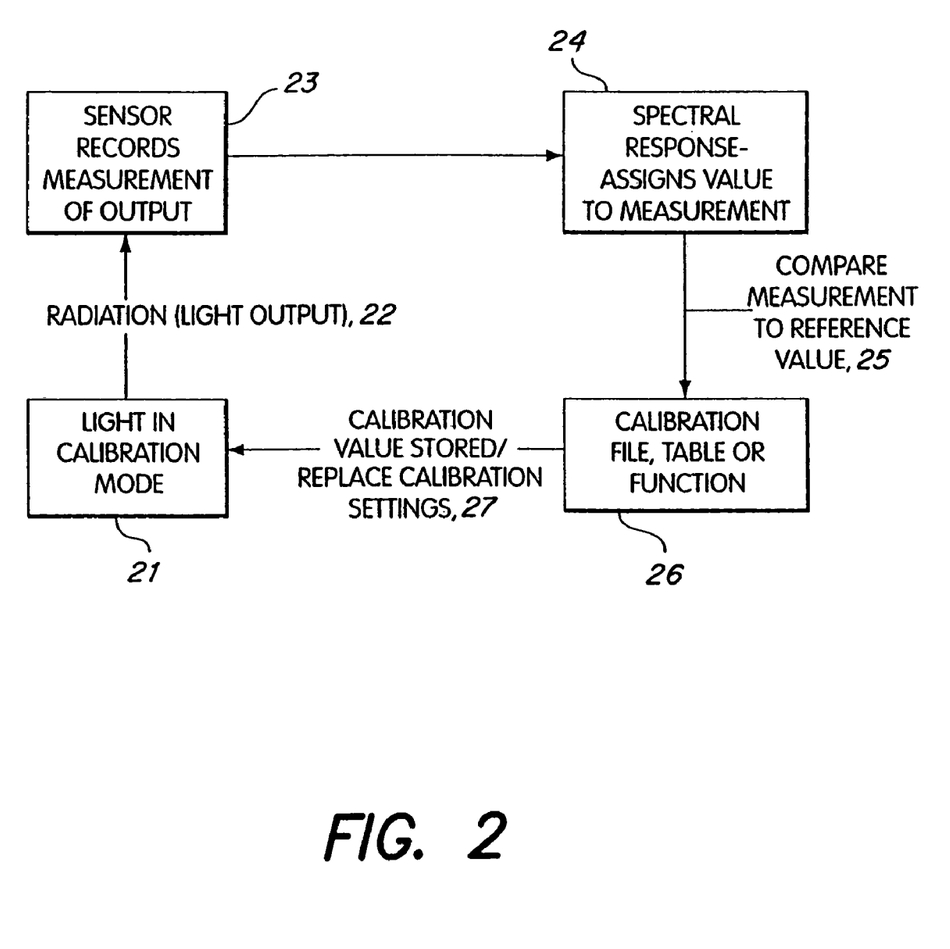
FIG. 2 illustrates schematically calibration of light output in accordance with an embodiment of the invention.
Figure 3A:
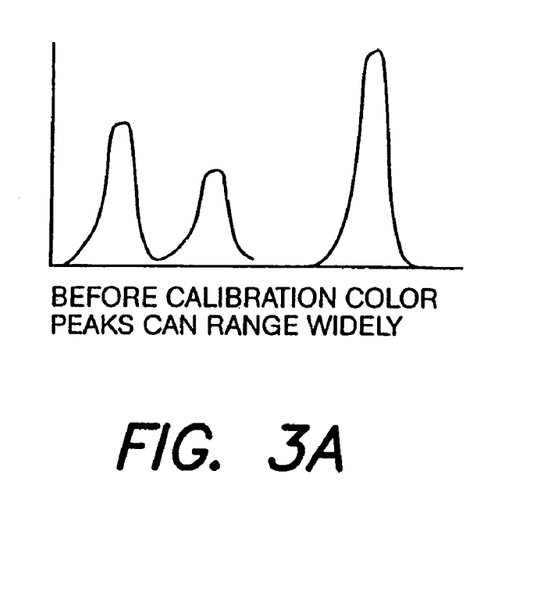
FIGS. 3A-B illustrate representative color peaks generated from an LED before calibration and after calibration.
Figure 3B:
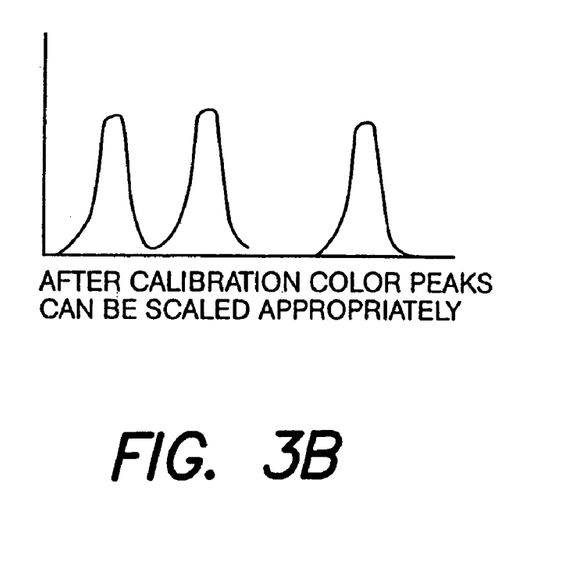

Referring now to FIG. 2, a process for calibrating light output is shown therein. Once the LED 13 is in position for calibration, as indicated in item 21, the LED 13 may be caused to generate a light output 22. If one or more LEDs 13 are being calibrated, each LED in the group may be caused to generate light output in sequential fashion. As each LED 13 generates its light output, for example, red, green or blue, the photosensor 14 records, in step 23, a peak measurement from the light output, and assigns, in step 24, as a spectral response, a relative value for the peak measurement. As shown in FIG. 3A, the peak value for the light output can vary widely. In step 25, the peak value for each individual output may be compared to a reference value (e.g., within a table of reference values) that had previously been established as representative for an LED of that type. If there are any differences between the peak value and the established reference value, the peak value for that individual output is adjusted, in step 26, by scaling that individual output to the reference value. The adjustment of the light output in this manner can result in the higher peaks being reduced (i.e., scaled) to match the value of the lower peaks, see FIG. 3B, to provide a uniform light output. It should be noted that several iterations (i.e., adjustments) may be needed to get an adjusted peak value that closely resembles the reference value. Moreover, in a situation wherein calibration of a plurality of LEDs is required, once calibration for one LED is completed, calibration for the next LED can be initiated.

In adjusting the output, a calibration value may be formulated. The calibration value for the light output of each LED 13 may then be stored, in step 27. This calibration value, once stored, can replace previous calibration settings, if any, and can be employed in all future/subsequent generation of light output by the LED 13. Storage of the calibration value can be accomplished by providing the LED 13 with a memory mechanism 17, such as a memory chip (see FIG. 1). In this manner, when commands are sent to the LED 13 for generating alight output, the stored calibration value for that particular LED may be accessed from the memory chip and used to permit the LED 13 to generate a light output which approximates a light output accorded to the reference value.

As indicated previously, the system 10 of the present invention may be used to adjust differences in the color output by an LED 13 when compared against a reference output. In addition, the system 10 may also be used to adjust the intensity of the light output by an LED.

The system 10 can further be used to check and/or diagnose a variety of other potential problems by analyzing the light output of the LED. For example, the system 10 can check to see whether the light output intensity of an LED is not in compliance with the reference output value. If such is the determination, the finding can indicate a circuit problem, missing LEDs, or LEDs incorrectly placed during the assembly process.

The system 10 may also be used to determine if there have been any LED placement errors during the LED board assembly. In particular, a discrepancy between a measured color value and referenced color value may indicate that one or more of the LEDs may have been placed improperly, e.g., a green LED in a red location or some other incorrect combination, during assembly.

If a substantial hue difference is detected, such may indicate that a particular run/batch of LEDs may have been improperly made, resulting in off-color LEDs.

The information obtained when employing the system 10 can also be used to identify problematic trends in the LED manufacturing process. For instance, the information may be use to determine whether the overall output by the LEDs is changing (i.e., deteriorating over time) for each batch of LEDs produced by comparing the initial information logged on the computer running the calibration software against the information from the latest batch.

As a note, should photosensor 14 or any of the listed sensors become unavailable, the system 10 is designed so that human eyes may be employed in the calibration, where a user could employ the processor 15 to calibrate the light output from the LED according to his subjective settings.

Figure 4:
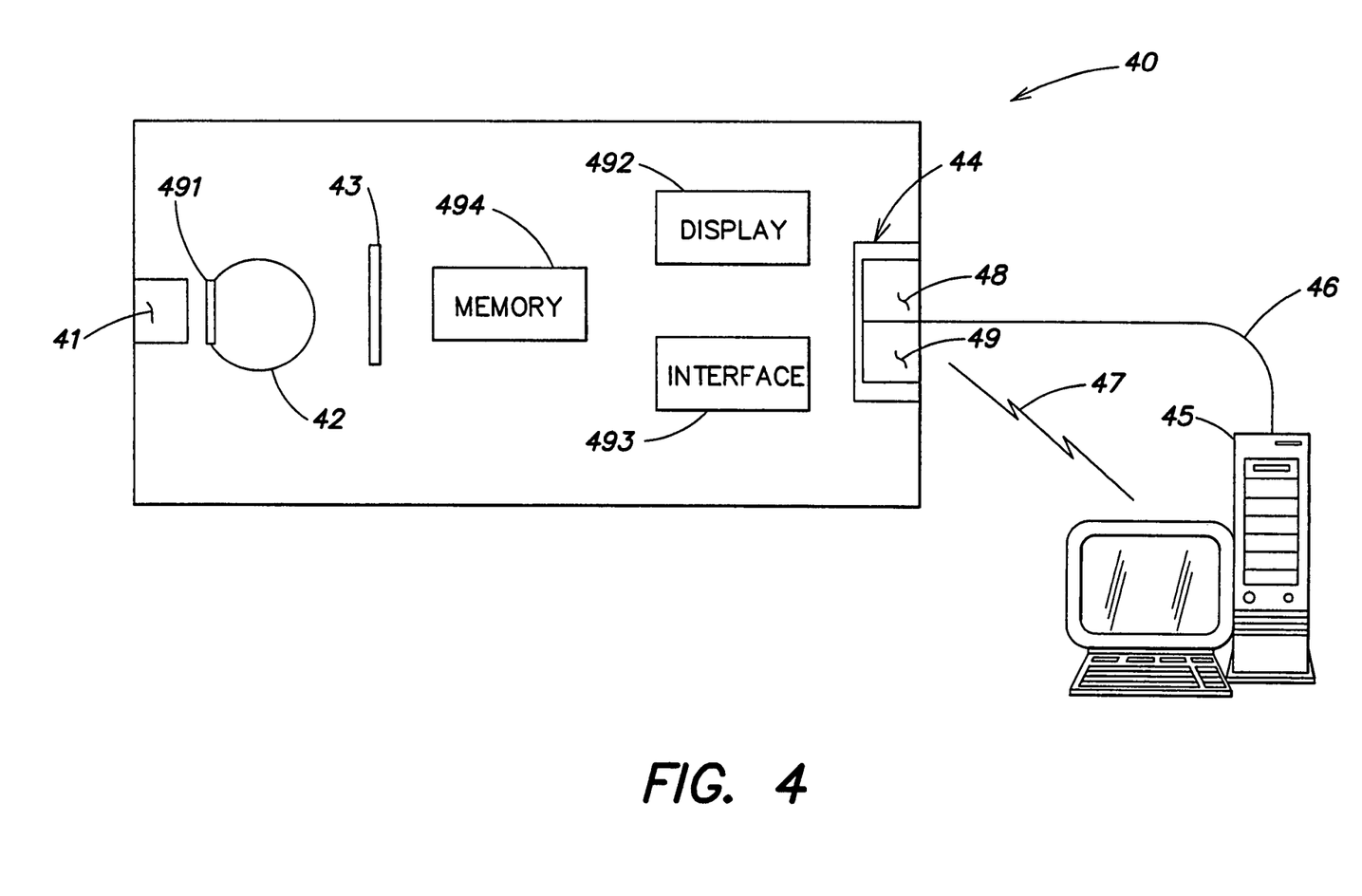
FIG. 4 illustrates, in accordance with an embodiment of the present invention, a device for calibrating light output from a light-emitting diode.

Looking now at FIG. 4, FIG. 4 illustrates, in accordance with an embodiment of the present invention, a device 40 for calibrating light output from a light-emitting diode. The device 40 includes a support 41, to which an LED 42, for instance, newly manufactured, or from an illumination device (not shown), may be positioned thereon for calibration. The device 40 also includes a photosensor 43 adjacent to the support 41 for obtaining an output measurement generated by the LED. The photosensor 43 may be placed in any location relative to the LED 42, so long as the photosensor 43 can receive the output by the LED 42. Accordingly, the location of the photosensor 43 may be adjustable within the device 40, so that for example, the photosensor 43 may be moved adjacent to the LED 42, or into substantial alignment with the LED 42.

The device 40 further includes a communication mechanism, such as port 44. The port 44 may be designed to be in coupling communication with the photosensor 43, so that an output measurement from the photosensor 43 may be communicated to a processor 45 for formulation of a calibration value. The port 44 may also be designed to be in coupling communication with the LED 42, so that data, such as the calibration value, from the processor 45 may be received and relayed to the LED 42.

Communication between the processor 45 and the port 44 may be by conventional cables 46, or by wires, network or a combination thereof. Alternatively, communication between the processor 45 and the port 44 may be by wireless means 47. Such wireless means include, but are not limited to, RF, IR, microwave, electromagnetic transmission, acoustic, Bluetooth, home RF, or other wireless means.

In employing wireless communication means, the port 44 may be provided with a transmitter 48, coupled to the photosensor 43, and a receiver 49, coupled to the LED 42.

Alternatively, the port 44 may be provided with a transceiver (not shown). The transmitter 48 and receiver 49 used in connection with the present invention are those commercially available, and of the type for receiving the signals provided herein.

It should be appreciated that the calibration value received from the processor 45 through the port 44 may be forwarded to the LED 42, and subsequently stored on a memory mechanism 491 in association with the LED 42. The memory mechanism 491, in one embodiment, may be physically coupled to the LED 42. The calibration value, as noted earlier, may be used in adjusting the light output of the LED, so that the light output approximates an output accorded to a reference value against which the calibration value was formulated.

The device 40, in one embodiment, may be a handheld device, and may include a display 492, on which parameters regarding light output from the LED 42 may be provided to inform a user of the status of the light output from the LED 42. The display 492 may provide information such as flux, candle power, energy, luminescence, color, CCT, CRI, x-coordinate, y-coordinate, or any other measurable parameter. The device 40 may also be provided with an interface 493 to permit the user to vary light output and/or parameters for the LED. In an alternate embodiment, instead of providing the device 40 with display 492 and user interface 493, information regarding the light output may be communicated through the port 44 to a unit having processing and display capability, such as a computer 45, to permit display and adjustment of the light output and the parameters from the LED 42. Communication of the information through the port 44 can be by conventional cables or by wireless means, as provided above.

The device 40 may also include a memory mechanism 494, separate from the memory mechanism 491 coupled to the LED 42. The memory mechanism 494 may be used for storing the output measurement from the photosensor 43 and other light output parameters, all of which can subsequently be communicated to an off-site processor 45 for calibration processing. In an alternate embodiment, the device 40 may incorporate the processor 45 within the device 40 to permit, for example, calibration to be carried out in a timely and efficient manner, without the need to communicate with an off-site processor.

Once the calibration is completed, the process stops and the LED 42 may be removed and returned to its illumination device.

Figure 5:
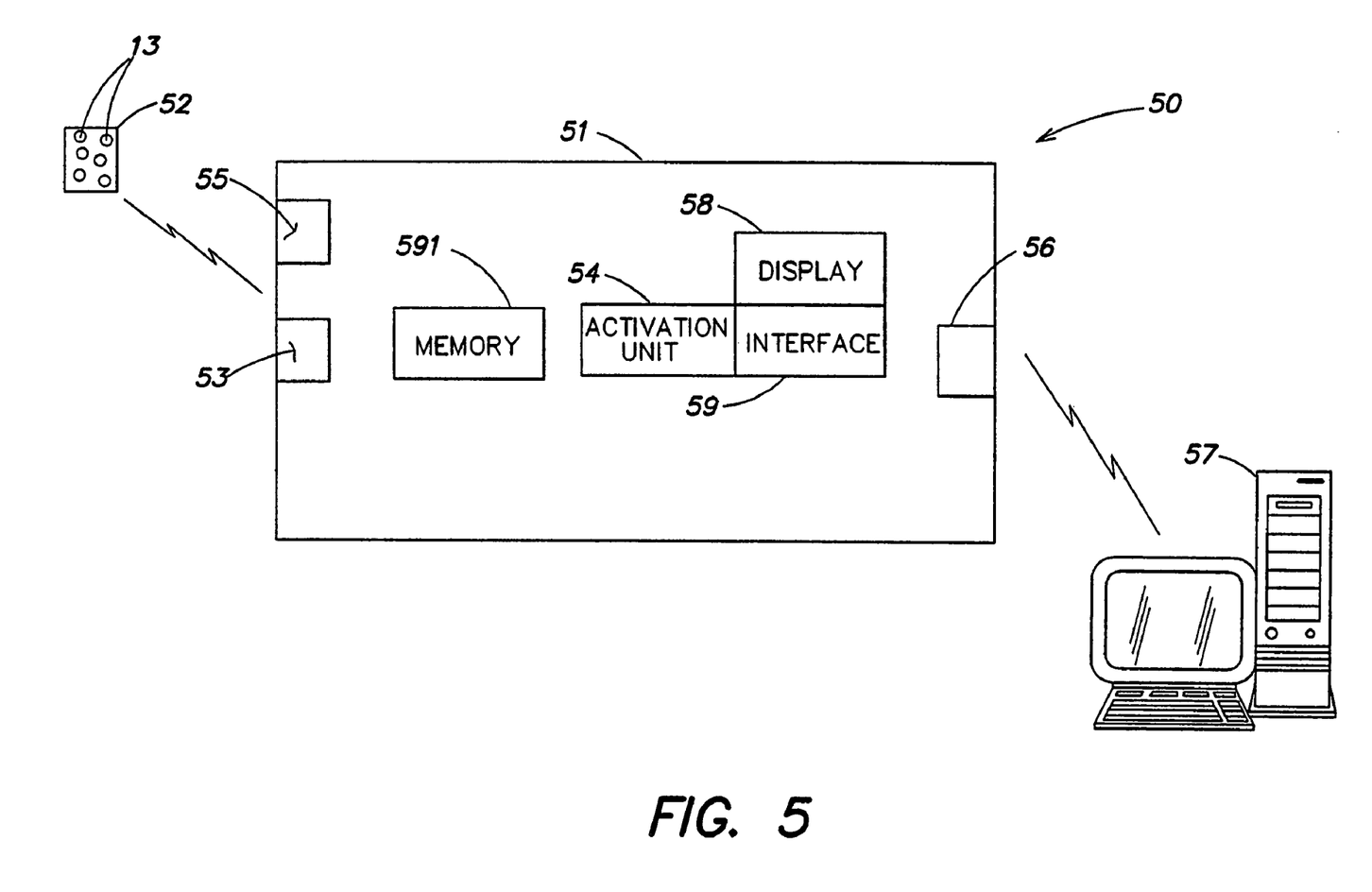
FIG. 5 illustrates, in accordance with another embodiment of the invention, a device for calibrating light output from a light-emitting diode.

In FIG. 5, another calibration device 50 is provided, in accordance with an embodiment of the present invention. The device 50 is similar to the device 40, illustrated in FIG. 4, except that the device 50 can be configured to calibrate the light output of one or more LEDs 13, without having to remove the one or more LEDs 13 from the illumination device 52 within which the one or more LEDs sit.

The calibration device 50, as shown in FIG. 5, includes a housing 51 and a photosensor 53 at one end of the housing 51 for obtaining an output measurement from the light output generated by the one or more LEDs 13. The photosensor 53 may be affixed at one end of the housing 51, or may be adjustable to alter its position within the housing 51. As the one or more LEDs will remain within the illumination device 52 and will not be positioned on the device 50 during calibration, the calibration device 50 may be provided with an activation unit 54 for inducing light output from the one or more LEDs 13. To activate the one or more LEDs 13 to generate a light output, the activation unit 54 may send a signal directed at the one or more LEDs 13. To this end, the illumination device 52 or the one or more LEDs 13 themselves may be designed with the ability to receive the signal from the activation unit 54. The signal from the activation unit 54 can be sent by conventional cable or wirelessly. In the wireless embodiment, the device 50 may include a transmitter 55 coupled to the activation unit 54 to transmit the signal. Correspondingly, the illumination device 52 can be provided with a receiver (not shown) coupled to the one or more LEDs 13 to receive the signal transmitted from the activation unit 54.

The calibration device 50 may also include a communication mechanism, such as a port 56, in the housing 51, similar to port 44 in device 40. In particular, the port 56 maybe designed to be in coupling communication with the photosensor 53, so that an output measurement from the photosensor 53 may be communicated to a processor 57 for formulation of a calibration value. The port 56 may also be designed so that data, such as the calibration value, from the processor 57 may be received by the device 50, and subsequently relayed to the one or more LEDs 13. The port 56 may employ conventional cables for communication or may employ wireless means, such as a transmitter or receiver, as described above. In one embodiment, the transmitter in connection with the port 56 and transmitter 55, used to transmit activation signals to the one or more LEDs 13, may be a single transmitter.

The device 50, in one embodiment, may include a display 58, on which parameters regarding light output from the one or more LEDs 13 may be provided to inform a user of the status of the light output from the one or more LEDs 13. The device 50 may also be provided with an interface 59 to permit the user to vary light output and/or parameters for the one or more LEDs. The device 50 may also include a memory mechanism 591. The memory mechanism 591 may be used for storing the output measurement from the photosensor 53, as well as other light output parameters, all of which can subsequently be communicated to an off-site processor 57 for calibration processing. In an alternate embodiment, the device 50 may incorporate the processor 57 within the device 50 to permit, for example, calibration to be carried out in a timely and efficient manner, without the need to communicate with an off-site processor.

Figure 6:
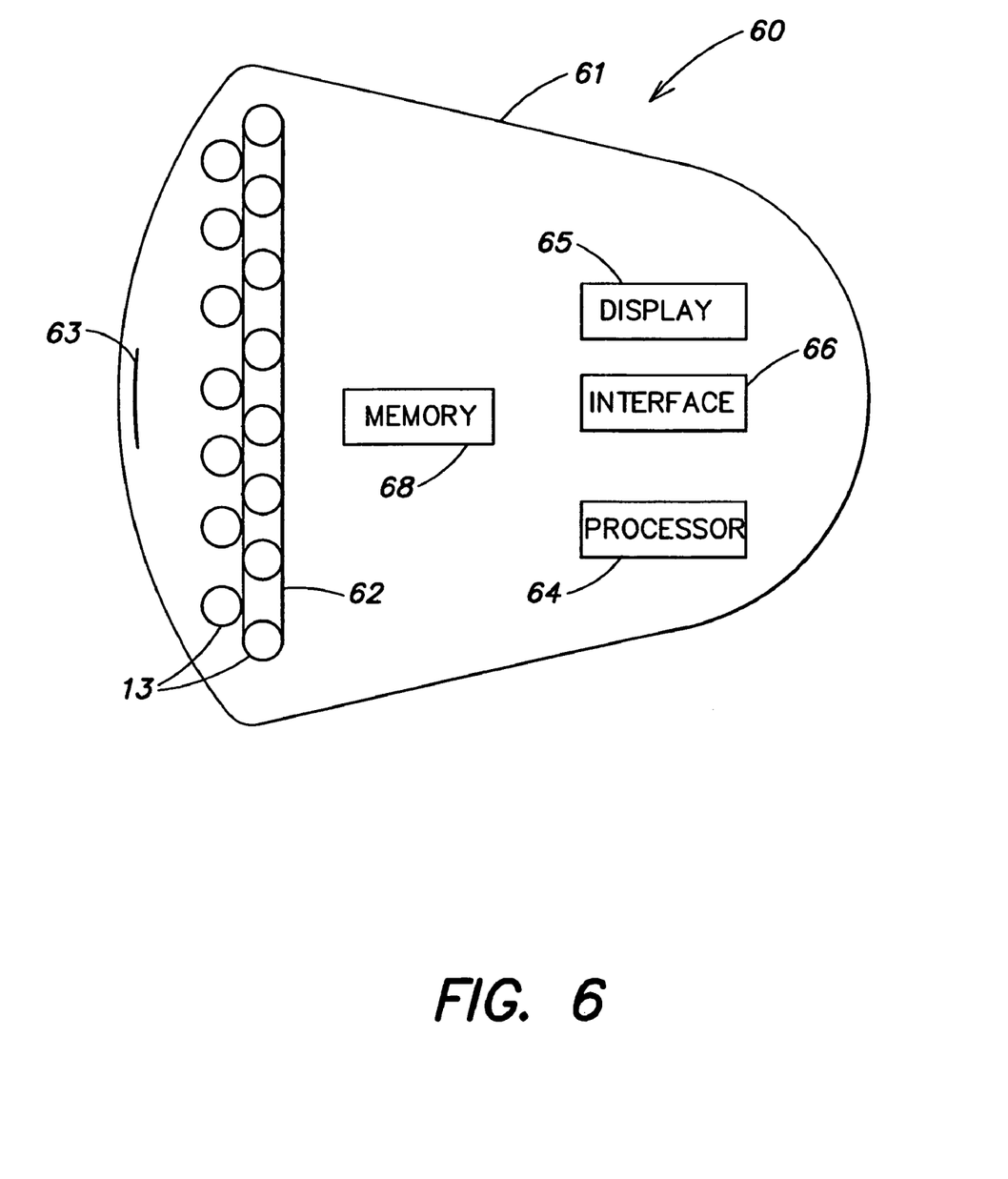
FIG. 6 illustrates, in accordance with one embodiment of the invention, an illumination device capable of calibrating the light output of its light-emitting diodes.

Looking now at FIG. 6, the present invention further provides an illumination device 60 which may be capable of self calibration. The device 60 may be similar to the module in U.S. Pat. No. 6,016,038, and includes a housing 61, and an LED illumination source 62 including one or more LEDs 13 within the housing 61. A photosensor 63 may be positioned adjacent to the LED illumination source 62 to obtain an output measurement generated by the LED illumination source 62. The position of the photosensor 63 relative to the LED illumination source 62, in one embodiment, permits the photosensor 63 to uniformly record the light output from the source 62.

The device 60 may also include a processor 64 within the housing 61 and in communication with the photosensor 63 for calibrating the output measurement from the photosensor 63 against a reference value. The processor 64 may also be in communication with the LED illumination source 62 for transmitting thereto a resulting calibration value from the processor 64. This calibration value may be used to affect the light output of the source 62, such that the output approximates an output accorded to the reference value. In one embodiment, the calibration process may be part of a feedback loop where the processor 64 monitors the light output from the source 62 via the photosensor 63 and automatically communicates the calibration value to the illumination source 62 to permit the light output to compensate for any changes.

The device 60 further includes a memory mechanism 68 coupled to the LED illumination source 62 and on which the resulting calibration value from the processor 64 may be stored. In one embodiment, the device 60 may include a display 65 on which parameters regarding light output from the LED illumination source 62 may be provided to inform a user of the status of the light output. The device 60 may further include an interface 66 to permit the user to vary the light output parameters.

By providing the device 60 with the above components, the device 60 may be activated to self-calibrate periodically. For instance, parameters regarding the illumination source 62 may be reviewed on the display 65. Should the illumination source 62 require calibration, the interface 66 may be accessed and the calibration process initiated. Once the calibration is completed, and the illumination source 62 can now generate a light output that approximates, for example, a light output defined by the user by way of the interface 66, the calibration ceases. In an embodiment of the invention, the device 60 may be designed to have the processor 64 initiate calibration, for instance, on a periodic basis, within certain predefined intervals, or in response to a particular condition, so that the light output from the illumination source 62 may be kept at a desired predefined level. Again, once calibration permits the illumination source 62 to achieve the desired light output level, the calibration ceases.

The systems, methods and devices provided in connection with the present invention may be used to calibrate an LED light source for a number of reasons, including but not limited to, intensity, color (hue or saturation), specific spectral properties, ambient conditions, internal temperature conditions, external ambient conditions or failure feedback (such as when one or more LEDs fails to operate).

While the invention has been described in connection with the specific embodiments thereof, it will be understood that it is capable of further modification. For example, the calibration value, although discussed as capable of being stored in a memory mechanism associated with the LED or in a memory mechanism on a calibrating device, can also be stored in the housing of an illumination device, or in a stand-alone device such as a computer. The calibration value can additionally be used as a reference value against which other calibration values may be adjusted. As a reference value, the calibration value, like other reference values used in the present invention, may be formatted within a table. In addition, reference value against which the output measurement may be adjusted can be any defined value, for example, a value obtained from the measurement of environmental lighting. Specifically, the photosensor may be used to take a reading of ambient light in a room. Such a reading and its associated value may be stored as a reference value. Subsequently, during calibration, the LED output may be adjusted to approximate the ambient light condition within the room.

Moreover, the calibration procedure, in accordance with an embodiment of the invention, may be accomplished through a network of lighting devices. In particular, the calibration value may be used to adjust the illumination properties of a new device so that it may be similar to the illumination properties of other devices in the network. As an example, a new lighting unit within a network can receive signals from the other devices which may initiate a calibration process in the new lighting unit. Information contained in the signals such as, but not limited to, age of the illumination devices within the network, the manufacturing date of the illumination devices, the illumination conditions of such devices, or combinations of parameters (such as age, manufacturing date, and previous calibration data), may cause the new lighting unit in the network to initiate a calibration procedure. In particular, as the older illumination devices in the network may be of a different quality, for example, they have lower light output, or they may have aged and deteriorated. By permitting the new lighting unit to calibrate, the new lighting unit would match the older illumination devices in the network.

The network of lighting units described may communicate through any communications method, such as but not limited to, wire, cable, network, RF, IR, microwave, acoustic, or electromagnetic communication. The units in the network may communicate other instructions along with the calibration information, or the units may only communicate the calibration information. In addition, there may be instances where the lighting units may be used in a networked fashion to allow coordinated lighting effects. The calibration information could be communicated using this network or a network specifically for calibration information. Moreover, the LEDs within the lighting units may also be used to communicate the calibration information to the other lighting units, for instance, by pulsing in a particular pattern.

Furthermore, this application is intended to cover any variations, uses, or adaptations of the invention, including such departures from the present disclosure as come within known or customary practice in the art to which the invention pertains, and as fall within the scope of the appended claims.

The invention claimed is:

1. An apparatus, comprising:
at least one first LED to generate first radiation having a first spectrum;
at least one second LED to generate second radiation having a second spectrum different than the first spectrum;
at least one controller to control at least one of the first radiation and the second radiation so as to provide visible radiation emanating from the apparatus; and
at least one sensor to monitor at least one characteristic of sample radiation and provide at least one sensor signal to the at least one controller,
wherein the sample radiation includes at least some of the visible radiation emanating from the apparatus, such that the at least one sensor signal provides at least one feedback signal to the at least one controller,
wherein the at least one controller is configured to make a comparison of the at least one feedback signal and at least one reference value and formulate at least one calibration value based on the comparison, and
wherein the at least one controller uses the at least one calibration value, once formulated, to control the at least one of the first radiation and the second radiation without using the at least one feedback signal,
the apparatus further comprising at least one memory coupled to the at least one controller to store the at least one reference value and the at least one calibration value.

2. The apparatus of claim 1, wherein the visible radiation comprises substantially white light.

3. The apparatus of claim 1, wherein the at least one sensor is configured to wirelessly communicate the at least one sensor signal to the at least one controller.

4. The apparatus of claim 1, wherein the at least one sensor is configured to communicate the at least one sensor signal to the at least one controller and at least one other device that is responsive to the at least one sensor signal.

5. The apparatus of claim 1, wherein the at least one sensor includes at least one of a photosensor, a photometer, a spectrophotomoeter, a spectroradiometer, a spectrum analyzer, a spectrometer, a charge coupled device (CCD), a photodiode, a photocell and a thermocouple.

6. The apparatus of claim 1, wherein the at least one controller is configured as at least one addressable controller to receive at least one lighting command via a network connection based on an address of the at least one addressable controller, so as to control at least one of the first radiation and the second radiation.

7. The apparatus of claim 5, wherein the at least one lighting command is communicated over the network connection using a DMX protocol.

8. The apparatus of claim 1, wherein the at least one feedback signal represents an intensity of the sample radiation.

9. The apparatus of claim 1, wherein the at least one feedback signal represents a spectral property of the sample radiation.

10. The apparatus of claim 9, wherein the spectral property of the sample radiation relates to a color or color temperature of the sample radiation.

11. The apparatus of claim 1, wherein the at least one controller is configured to process the at least one feedback signal to determine a peak measurement associated with the sample radiation.

12. The apparatus of claim 1, wherein the at least one controller is configured to control at least one characteristic of the visible radiation based at least in part on the at least one feedback signal provided by the at least one sensor.

13. The apparatus of claim 12, further comprising at least one user interface coupled to the at least one controller to permit a user to control the visible radiation.

14. The apparatus of claim 13, wherein the visible radiation comprises substantially white light.

15. The apparatus of claim 12, further comprising an at least partially transparent housing that encloses at least the at least one first LED, the at least one second LED, and the at least one sensor.

16. The apparatus of claim 15, wherein the at least partially transparent housing is configured to resemble a conventional light bulb.

17. The apparatus of claim 15, wherein the at least partially transparent housing comprises at least one connector that is adapted to engage mechanically and electrically with a conventional light socket arrangement.

18. The apparatus of claim 1, wherein the at least one reference value represents an expected characteristic of the sample radiation.

19. The apparatus of claim 18, wherein the expected characteristic of the sample radiation relates to a performance metric associated with at least one of the at least one first LED and the at least one second LED.

20. The apparatus of claim 19, wherein the performance metric includes a bin associated with at least one of the at least one first LED and the at least one second LED.

21. The apparatus of claim 1, wherein the at least one reference value represents a previous calibration value.

22. The apparatus of claim 1, wherein the at least one reference value represents an ambient light condition.

23. The apparatus of claim 1, further including at least one user interface coupled to the at least one controller to permit a user to define the at least one reference value.

24. The apparatus of claim 1, wherein the at least one reference value includes a plurality of pre-programmed reference values that are stored in the at least one memory.

25. The apparatus of claim 24, wherein the plurality of pre-programmed reference values are stored in the at least one memory as a table of values representative of respective types of at least the at least one first LED and the at least one second LED.

26. The apparatus of claim 1, wherein the at least one controller is configured to strobe or flash at least the at least one first LED and the at least one second LED at predetermined intervals through a plurality of lighting conditions and monitor the at least one feedback signal.

27. The apparatus of claim 26, wherein the at least one controller is configured to strobe or flash at least the at least one first LED and the at least one second LED between different colors while monitoring the at least one feedback signal.

28. The apparatus of claim 1, wherein the at least one controller is configured to control at least the at least one first LED and the at least one second LED in a sequential fashion and wherein the at least one feedback signal includes at least a first feedback signal associated with the first radiation and a second feedback signal associated with the second radiation.

29. The apparatus of claim 28, wherein the at least one controller is configured to process at least the first feedback signal to determine a first peak measurement associated with the first radiation, and process the second feedback signal to determine a second peak measurement associated with the second radiation.

30. The apparatus of claim 28, wherein the at least one controller is configured to make a first comparison of the first feedback signal and a first reference value and formulate a first calibration value based on the first comparison, and make a second comparison of the second feedback signal and a second reference value and formulate a second calibration value based on the second comparison.

31. The apparatus of claim 1, wherein the at least one controller is configured to control at least one characteristic of the visible radiation based at least in part on the at least one calibration value.

32. The apparatus of claim 31, wherein the at least one controller includes calibration means for adjusting at least one of the first radiation and the second radiation, based on the at least one calibration value, such that the visible radiation has a calibrated color.

33. The apparatus of claim 32, wherein the visible radiation is a substantially white light, and wherein the calibration means is configured to adjust the at least one of the first radiation and the second radiation, based on the at least one calibration value, such that the visible radiation has a calibrated substantially white color.

34. The apparatus of claim 32, wherein the calibration means includes means for scaling the at least one of the first radiation and the second radiation so as to produce the calibrated color.

35. The apparatus of claim 32, wherein the calibration means includes means for adjusting commands sent to at least one of the at least one first LED and the at least one second LED, based on the at least one calibration value, so as to produce the calibrated color.

36. The apparatus of claim 32, wherein the at least one reference value is based on at least one ambient lighting condition.

37. The apparatus of claim 36, wherein the calibration means is configured to adjust the at least one of the first radiation and the second radiation, based on the at least one calibration value, such that the visible radiation approximates the at least one ambient lighting condition.

38. A method, comprising acts of:
A) energizing at least one first LED so as to generate first radiation having a first spectrum;
B) energizing at least one second LED so as to generate second radiation having a second spectrum different than the first spectrum;
C) monitoring at least one characteristic of sample radiation;
D) generating at least one feedback signal based on the act C), wherein the sample radiation includes at least some of the first radiation and/or the second radiation;
E) making a comparison of the at least one feedback signal and at least one reference value;
F) formulating at least one calibration value based on the comparison;
G) storing in memory at least the at least one reference value and the at least one calibration value; and
H) controlling the first radiation and/or the second radiation using the at least one calibration value and without using the at least one feedback signal.

39. The method of claim 38, wherein the act H) comprises an act of controlling at least one of the first radiation and the second radiation such that the visible radiation comprises substantially white light.

40. The method of claim 38, wherein the act H) includes an act of:
H1) processing at least one addressed lighting command communicated via a network connection so as to control at least one of the first radiation and the second radiation.

41. The method of claim 40, wherein the act H1) includes an act of:
communicating the least one lighting command over the network connection using a DMX protocol.

42. The method of claim 38, wherein the at least one characteristic includes an intensity of the sample radiation.

43. The method of claim 38, wherein the at least one characteristic includes a spectral property of the sample radiation.

44. The method of claim 43, wherein the spectral property of the sample radiation relates to a color or color temperature of the sample radiation.

45. The method of claim 38, further comprising an act of:
determining a peak measurement associated with the sample radiation based on the act C).

46. The method of claim 38, wherein the at least one reference value represents an expected characteristic of the sample radiation.

47. The method of claim 46, wherein the expected characteristic of the sample radiation relates to a performance metric associated with at least one of the at least one first LED and the at least one second LED.

48. The method of claim 47, wherein the performance metric includes a bin associated with at least one of the at least one first LED and the at least one second LED.

49. The method of claim 38, wherein the at least one reference value represents a previous calibration value.

50. The method of claim 38, wherein the at least one reference value represents an ambient light condition.

51. The method of claim 38, further comprising an act of permitting a user to define the at least one reference value.

52. The method of claim 38, wherein the at least one reference value includes a plurality of pre-programmed reference values, and wherein the act of storing includes an act of storing in the memory the plurality of pre-programmed reference values.

53. The method of claim 52, wherein the act of storing includes an act of storing the plurality of pre-programmed reference values as a table of values representative of respective types of at least the at least one first LED and the at least one second LED.

54. The method of claim 38, further comprising an act of:
strobing or flashing at least the at least one first LED and the at least one second LED at predetermined intervals through a plurality of lighting conditions while performing the act C).

55. The method of claim 54, wherein the act of strobing or flashing includes an act of strobing or flashing at least the at least one first LED and the at least one second LED between different colors while performing the act C).

56. The method of claim 38, further comprising an act of:
controlling at least the at least one first LED and the at least one second LED in a sequential fashion while performing the act C) so as to provide a first feedback signal associated with the first radiation and a second feedback signal associated with the second radiation.

57. The method of claim 56, further comprising acts of:
processing at least the first feedback signal to determine a first peak measurement associated with the first radiation; and
processing the second feedback signal to determine a second peak measurement associated with the second radiation.

58. The method of claim 57, further comprising acts of:
making a first comparison of the first feedback signal and a first reference value;
formulating a first calibration value based on the first comparison;
making a second comparison of the second feedback signal and a second reference value; and
formulating a second calibration value based on the second comparison.

59. The method of claim 38, wherein the act H) includes an act of:
H1) controlling at least one characteristic of the visible radiation based at least in part on the at least one calibration value.

60. The method of claim 59, wherein the act H1) includes an act of:
adjusting at least one of the first radiation and the second radiation, based on the at least one calibration value, such that the visible radiation has a calibrated color.

61. The method of claim 60, wherein the visible radiation is a substantially white light, and wherein the act of adjusting includes an act of adjusting the at least one of the first radiation and the second radiation, based on the at least one calibration value, such that the visible radiation has a calibrated substantially white color.

62. The method of claim 60, wherein the act H1) includes an act of:
scaling the at least one of the first radiation and the second radiation so as to produce the calibrated color.

63. The method of claim 60, wherein the act H1) includes an act of:
adjusting commands sent to at least one of the at least one first LED and the at least one second LED, based on the at least one calibration value, so as to produce the calibrated color.

64. The method of claim 60, wherein the at least one reference value is based on at least one ambient lighting condition.

65. The method of claim 64, wherein the act H1) includes an act of:
adjusting the at least one of the first radiation and the second radiation, based on the at least one calibration value, such that the visible radiation approximates the ambient lighting condition.

* * * * *